March 13, 1945. M. P. MATUSZAK 2,371,341
RECOVERY OF HYDROFLUORIC ACID
Filed Aug. 6, 1943
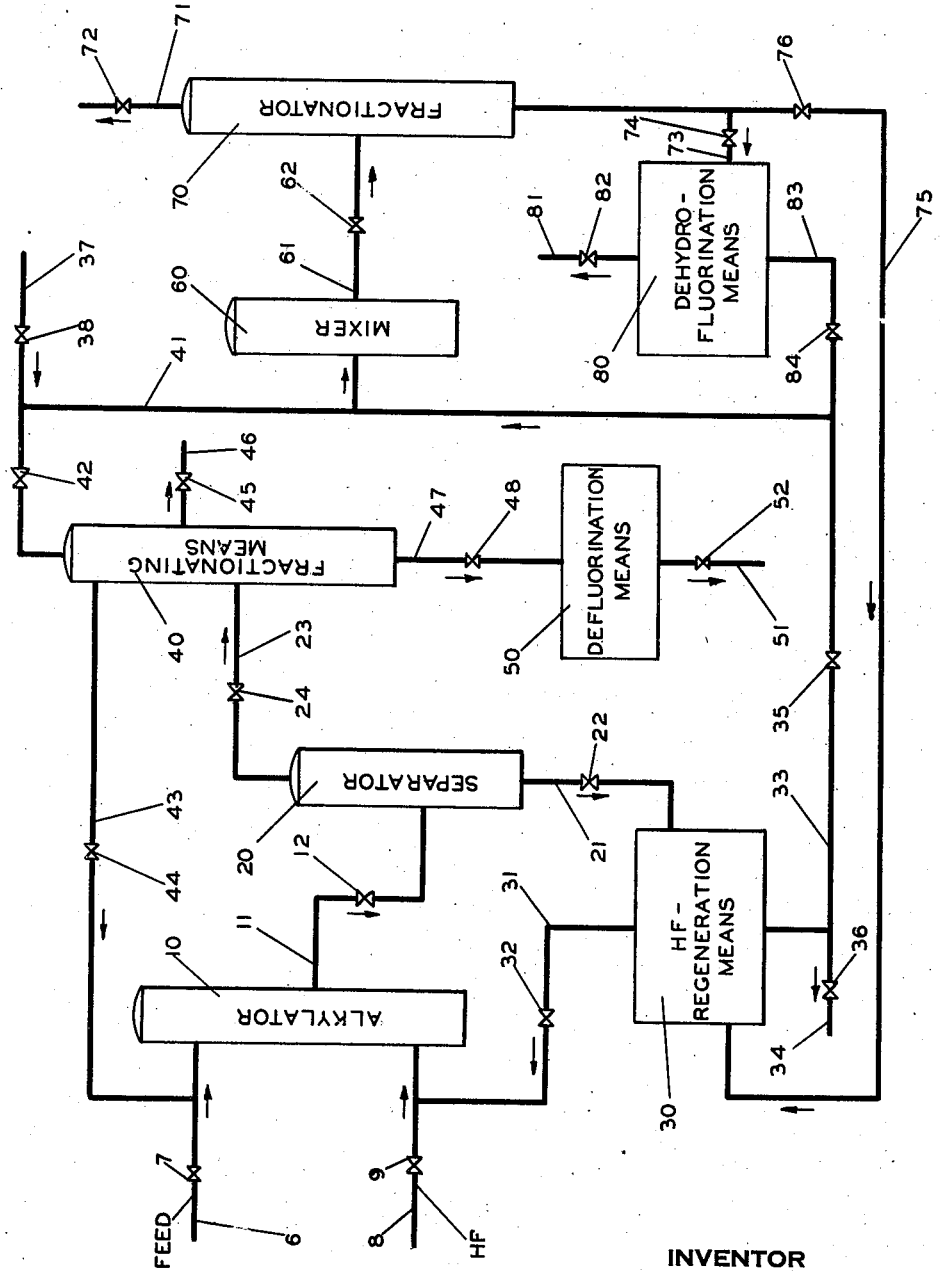
INVENTOR
M. P. MATUSZAK
BY Hudson, Young & Yinger.
ATTORNEYS Patented Mar. 13, 1945

2,371,341

UNITED STATES PATENT OFFICE 2,371,341

RECOVERY OF HYDROFLUORIC ACID

Maryan P. Matuszak, Bartlesville, Okla., assignor to Phillips Petroleum Company, a corporation of Delaware Application August 6, 1943, Serial No. 497,637

12 Claims. (Cl. 260—683.4)

This invention relates to the recovery of hydrofluoric acid. More particularly, it relates to the recovery of hydrofluoric acid from homogeneous mixtures with low-boiling saturated aliphatic hydrocarbons by means of a heavy olefinic oil readily separable from the low-boiling hydrocarbons.

Concentrated or substantially anhydrous hydrofluoric acid is used in many modern processes. For example, it is used as a catalyst in the conversion of hydrocarbons by alkylation, isomerization, reconstruction, cracking, cyclization, and/or aromatization; as a reactant in the production of alkyl fluorides; and as a scrubbing agent or selective solvent for the removal of certain impurities from saturated hydrocarbons. From such processes it is often necessary or convenient to withdraw, for example, low-boiling or azeotropic mixtures of hydrofluoric acid and saturated hydrocarbons. The corrosive nature of hydrofluoric acid makes desirable its removal from such mixtures; in the past, removal has been commonly effected by neutralization of the acid with alkaline materials, such as lime, but this procedure has the disadvantage that the acid becomes chemically bound and is lost to the process. Since in commercial processes the loss of hydrofluoric acid in such mixtures is economically significant, recovery of the acid as such is desirable.

Hydrofluoric acid used as a catalyst for alkylating purposes gradually becomes spent or deactivated, apparently by dilution with acid-soluble by-products, to such a degree that it is no longer suited for continued use as an alkylation catalyst. In consequence of this fact, a part of the acid is usually withdrawn continuously or intermittently from the alkylation step and is purified or recovered by fractional distillation and decomposition of organic fluorine compounds to liberate the fluorine as hydrofluoric acid. The kettle product from such a recovery step is a heavy olefinic oil of relatively high molecular weight.

An object of this invention is to recover hydrofluoric acid from homogeneous mixtures of hydrofluoric acid and low-boiling hydrocarbons.

Another object is to reduce the loss of hydrofluoric acid in processes in which it is used as a catalyst.

Still another object is to utilize the heavy olefinic oil separated during regeneration of spent alkylation hydrofluoric acid for the recovery of hydrofluoric acid from a mixture of hydrocarbons and hydrofluoric acid.

Other objects and advantages of this invention will be apparent from the following description, the accompanying drawing, and/or the appended claims.

According to one specific embodiment of this invention, hydrofluoric acid is recovered from a homogeneous mixture with one or more saturated hydrocarbons boiling below about 100° F., such as paraffins having three to five carbon atoms per molecule, by contacting the mixture, batchwise or continuously, with a relatively heavy olefinic oil, preferably the heavy olefinic oil obtained as a kettle product from the distillation-regeneration of used alkylation hydrofluoric acid, removing the low-boiling hydrocarbons, and subjecting the oil to a thermal decomposition-distillation whereby the hydrofluoric acid is liberated and recovered as such. Other satisfactory olefinic oils are those containing olefinic or unsaturated compounds that combine readily with hydrogen fluoride at ordinary temperatures; among especially satisfactory oils are natural and synthetic terpenes, of which pinene and camphene are specific examples.

Understanding of this invention may be facilitated by reference to the accompanying drawing, which is a schematic flow diagram of one arrangement of apparatus suitable for practicing the invention. For the sake of concreteness, this flow diagram illustrates the recovery of hydrofluoric acid in connection with the hydrofluoric acid alkylation of an alkylatable hydrocarbon with an alkylating agent.

A hydrocarbon feed enters the system through one or more inlets represented by inlet 6 controlled by valve 7 and is passed to alkylator 10. This feed comprises an alkylatable hydrocarbon, which is usually an isoparaffin, such as isobutane or isopentane, or an aromatic hydrocarbon, such as benzene, and an alkylating agent, which is usually one or more olefins of three to five carbon atoms per molecule, such as the butylenes; it also generally comprises some relatively inert paraffins, such as normal butane and propane. Concentrated or substantially anhydrous hydrofluoric acid enters alkylator 10 through inlet 8 controlled by valve 9 and is intimately mixed with the hydrocarbon feed by any convenient means. The over-all mol ratio of alkylatable hydrocarbon to olefin is usually 4:1 to 20:1 in the feed and much higher in the reaction zone. The volume ratio of hydrocarbons to acid in the reaction zone is usually approximately 1:1, although other ratios may be maintained if desired. Satisfactory operating conditions in alkylator 10, for example, for the alkylation of isobutane with olefins of three to four carbon atoms per molecule, are: a temperature in the range of 75° to 125° F., although the alkylation may be conducted at lower and higher temperatures if desired; a pressure sufficient to maintain the reactants in a liquid phase; and a contact or residence time in the alkylator of from 5 to 15 minutes, but it may be shorter or longer if desired.

After a suitable contact time, the reaction mixture from alkylator 10 is passed through conduit 11 controlled by valve 12 to settler or separator 20, in which it is separated into two liquid phases by settling and/or centrifugation, aided, if desired, by cooling. The heavier or hydrofluoric acid phase is passed through conduit 21 controlled by valve 22 to hydrofluoric acid-regeneration means or still 30, wherein it is heated and/or fractionally distilled into the following fractions: a relatively large light fraction, comprising chiefly hydrofluoric acid, dissolved isobutane and other low-boiling hydrocarbons, and some low-boiling organic fluorine compounds, that is recycled through conduit 31 controlled by valve 32 to alkylator 10; and a relatively small heavy or oil fraction boiling mostly above about 300° F. and comprising chiefly acid-soluble olefinic organic compounds of relatively high molecular weight, that is passed through conduit 33 to mixer 60 and/or is withdrawn through outlet 34 in proportions controlled by valves 35 and 36, respectively.

The lighter or hydrocarbon phase from separator 20 is transferred through conduit 23 controlled by valve 24 to fractionating means 40 wherein it is separted into various product, by-product, and recycle fractions. A low-boiling or azeotropic mixture of hydrofluoric acid and low-boiling paraffins, such as propane and isobutane, is passed overhead through conduit 41 controlled by valve 42 to mixer 60. A fraction consisting predominantly of isobutane is recycled through conduit 43 controlled by valve 44 to alkylator 10. A fraction comprising normal butane may be withdrawn through outlet 45 controlled by valve 46; if desired, it may be passed to a dehydrogenation means, not shown, in which it is converted into olefins that may be utilized as the alkylating agent in alkylator 10. An alkylate fraction comprising highly branched normally liquid hydrocarbons suitable for use in aviation gasoline is passed through conduit 47 controlled by valve 48 to defluorination means 50, in which it is substantially freed from organic fluorine compounds by contact with a contact mass having catalytic hydrogenation and/or dehydrogenation properties, such as bauxite, alumina, chromium oxide, or similar material, at a temperature in the range of about 100° to 400° F. and at a space velocity in the range of about 1 to 50 volumes of liquid hydrocarbon material per volume of contact mass per hour; the resulting fluorine-free hydrocarbon material is then passed through outlet 51 controlled by valve 52 to storage or, if desired, to further processing means, not shown.

One aspect of the present invention is concerned primarily with the low-boiling or azeotropic mixture of hydrofluoric acid and low-boiling paraffins that is obtained as an overhead fraction from fractionating means 40. This fraction is thoroughly mixed in mixer 60 with the heavy olefinic oil passed from hydrofluoric acid-regeneration means 30 through conduit 33. Substantially complete absorption of hydrofluoric acid, apparently by hydrofluorination of some of the olefinic compounds in the oil, takes place.

The conditions of temperature and pressure in this absorption are not critical, provided that the temperature is not so high as to prevent the hydrofluorination. The low-boiling paraffins may be in the gas phase, but ordinarily the operation is preferably conducted at pressures such that the hydrocarbons are in the liquid phase. A generally satisfactory temperature range is 50° to 125° F. or somewhat higher; a preferred range is 75° to 100° F. Under these conditions the absorption or hydrofluorination is substantially complete within 2 to 20 minutes; it appears to be catalytically initiated and/or promoted by the presence of a trace of dissolved moisture, which accordingly may be advantageously added, as through inlet 37 controlled by valve 38. The optimum operating conditions for any particular case may be determined by trial by anyone skilled in the art. The resulting mixture of low-boiling paraffins, absorbed hydrofluoric acid, and heavy oil is passed from mixer 60 to fractionator 70, in which it is separated into two fractions: a substantially acid-free light or overhead fraction consisting of the low-boiling paraffins, which is removed through outlet 71 controlled by valve 72, and a heavy or kettle fraction consisting of the acid-soluble oil and absorbed and/or chemically combined hydrofluoric acid. This kettle fraction may be passed through conduit 73 controlled by valve 74 to dehydrofluorination means or still 80, in which it is heated to about 300° to 350° F., or more, as may be required to liberate substantially all of the hydrofluoric acid; most of the hydrofluoric acid appears to be liberated below about 225° F. The liberated hydrofluoric acid may be withdrawn as an overhead fraction through outlet 81 controlled by valve 82, or it may be recycled to alkylator 10 by means not shown; the resulting dehydrofluorinated oil may be recycled to mixer 60, as through conduit 83 controlled by valve 84, for re-use in recovering hydrofluoric acid. Preferably, however, in the interest of reducing the over-all equipment by elimination of dehydrofluorination means 80, the kettle fraction from fractionator 70 is passed through conduit 75 controlled by valve 76 to a suitable point in hydrofluoric acid-regeneration means 30, in which the hydrofluoric acid is liberated in similar fashion and from which it is returned to alkylator 10, as has been already described.

When, as sometimes may happen, the overhead fraction from fractionator 70 is not substantially acid-free, it may be subjected to one or more additional stages of mixing with heavy olefinic oil and fractionation, in equipment similar to or identical with mixer 60 and fractionator 70.

When the mixture comprising hydrofluoric acid to be recovered contains an appreciable proportion of a difficultly condensable gas, such as methane or ethane, or when it is under such conditions that it is in the gaseous phase, mixer 60 may be conveniently a countercurrent extractor, wherein the heavy olefinic oil absorbs the hydrofluoric acid and wherefrom the acid-denuded gas is withdrawn; subsequent removal of dissolved low-boiling hydrocarbons and/or liberation of the hydrofluoric acid from the heavy-oil extract may be practiced as has been already described.

By fractionating means, or similar terms, as used in this specification, is meant a system of one or more fractional-distillation devices that will effect the results indicated. It will be understood that numerous minor modifications and variations of this invention will be obvious to those skilled in the art. The drawing is purely schematical; additional devices, such as pumps, valves, conduits, coolers, fractionators, etc., may be used in any particular case wherever they are deemed necessary or convenient for obtaining the results indicated, without passing beyond the scope of this invention or the spirit of this disclosure.

Some aspects of the invention are further illustrated by the following example.

*Example*

A low-boiling mixture, comprising a major proportion by weight of low-boiling hydrocarbons, chiefly propane and isobutane, and a minor proportion of hydrofluoric acid, is obtained in a system for the hydrofluoric acid alkylation of isobutane with olefins of three to four carbon atoms per molecule. To this mixture is added a stoichiometrical excess of the heavy olefinic oil obtained as a kettle product in the distillation-regeneration of spent hydrofluoric acid (titratable acidity about 85 per cent by weight) from the same alkylation system. The oil added is usually preferably 1.5 to 2 stoichiometric equivalents of the hydrofluoric acid; but larger amounts may be used and have the advantage of making the absorption of hydrofluoric acid faster. This oil appears to contain aliphatic and/or cyclic olefins; one sample, which may be regarded as more or less typical, gave the following characterization data:

| | |
|---|---|
| Gravity, ° A. P. I. | 16.2 |
| Organic fluorine, wt. percent | 0.1 |
| A. S. T. M.-type distillation, ° F.: | |
| First drop | 220 |
| 5% | 480 |
| 10% | 546 |
| 30% | 604 |
| 50% | 627 |
| 60% | 635 |
| 70% | [1] 640 |

[1] Cracking begins.

From the resulting mixture, the low-boiling hydrocarbons are removed by flashing and/or fractional distillation, and the residue is passed to the distillation-regeneration step, for liberation of the hydrofluoric acid, which is thereupon returned to the alkylation step for re-use as alkylation catalysts.

A similar procedure is useful for the recovery of hydrofluoric acid from other homogeneous mixtures of low-boiling hydrocarbons and hydrofluoric acid, such as those obtained in the various hydrofluoric acid-utilizing conversions and/or treatments hereinbefore mentioned. In particular, hydrofluoric acid-containing mixtures from pop-off valves or relief valves may be advantageously so treated to recover the hydrofluoric acid, which otherwise would be lost.

The invention should be restricted only in accordance with the appended claims.

What is claimed is:

1. A process for recovering hydrofluoric acid from a homogeneous mixture containing a major proportion of hydrocarbons boiling below about 100° F. and a minor proportion of hydrofluoric acid, which comprises contacting with said material an olefinic oil boiling above about 300° F. and having olefinic compounds in stoichiometric excess of said dissolved hydrofluoric acid, removing the hydrocarbons boiling below about 100° F., and heating the resulting residue to liberate and separate the hydrofluoric acid.

2. The process of claim 1, in which said homogeneous material is a low-boiling mixture of paraffins of three to five carbon atoms per molecule and hydrofluoric acid.

3. The process of claim 1, in which said contacting is effected with said mixture in the liquid phase.

4. The process of claim 1 in which said olefinic oil is the heavy olefinic oil obtained as a kettle product from the distillation-regeneration of spent hydrofluoric acid used for the alkylation of an alkylatable hydrocarbon.

5. The process of claim 1 in which said olefinic oil is the heavy olefinic oil obtained as a kettle product from the distillation-regeneration of spent hydrofluoric acid used for the alkylation of isobutane.

6. The process of claim 1, in which the amount of olefinic compounds in said olefinic oil is 1.5 to 2 stoichiometric equivalents of said dissolved hydrofluoric acid.

7. The process of claim 1, in which said olefinic oil comprises a terpene.

8. The process of claim 1, in which said contacting is effected in the presence of a trace of moisture.

9. The process which comprises alkylating an alkylatable hydrocarbon in the presence of liquid hydrofluoric acid, separating the resulting alkylation mixture into a hydrocarbon liquid phase and a hydrofluoric acid liquid phase, distilling from said hydrocarbon liquid phase a low-boiling fraction comprising a low-boiling paraffin and dissolved hydrofluoric acid, distilling said hydrofluoric acid liquid phase to obtain therefrom a kettle product boiling above about 300° F., mixing said low-boiling fraction and said kettle product, distilling from the resulting mixture said low-boiling paraffin, heating the resulting residue to liberate and distill therefrom hydrofluoric acid, and recycling the thus liberated hydrofluoric acid to the alkylation step.

10. The process of claim 1 in which said contacting is effected at a temperature of from 75° to 100° F.

11. The process which comprises alkylating an alkylatable hydrocarbon in the presence of liquid hydrofluoric acid, separating the resulting alkylation mixture into a hydrocarbon liquid phase and a hydrofluoric acid liquid phase, distilling from said hydrocarbon liquid phase a low-boiling fraction comprising a low-boiling paraffin and dissolved hydrofluoric acid, distilling said hydrofluoric acid liquid phase to obtain therefrom a kettle product boiling above about 300° F., mixing said low-boiling fraction and said kettle product, distilling from the resulting mixture said low-boiling paraffin, passing the resulting residue to said step of distilling said hydrofluoric acid liquid phase and distilling said residue in admixture with said hydrofluoric acid liquid phase to liberate and distill therefrom hydrofluoric acid, and recycling the thus liberated hydrofluoric acid to the alkylation step.

12. The process of claim 1, in which said homogeneous mixture is in the gaseous phase and in which said contacting is effected countercurrently.

MARYAN P. MATUSZAK.